(12) United States Patent
Miura

(10) Patent No.: US 7,442,452 B2
(45) Date of Patent: Oct. 28, 2008

(54) FUEL CELL SYSTEM AND GAS LEAK DETECTION METHOD

(75) Inventor: Shimpei Miura, Mishima (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 390 days.

(21) Appl. No.: 10/559,931

(22) PCT Filed: Jun. 17, 2004

(86) PCT No.: PCT/IB2004/002019

§ 371 (c)(1),
(2), (4) Date: Dec. 8, 2005

(87) PCT Pub. No.: WO2004/112179

PCT Pub. Date: Dec. 23, 2004

(65) Prior Publication Data

US 2006/0166060 A1 Jul. 27, 2006

(30) Foreign Application Priority Data

Jun. 19, 2003 (JP) ............................. 2003-175118

(51) Int. Cl.
*H01M 8/04* (2006.01)
(52) U.S. Cl. ............................. 429/13; 429/25; 429/35
(58) Field of Classification Search .................. 429/13, 429/22, 25, 35, 38, 39; 73/40.5 R, 49.1
See application file for complete search history.

(56) References Cited

U.S. PATENT DOCUMENTS

| 6,156,447 A * | 12/2000 | Bette et al. ..................... 429/13 |
| 6,492,043 B1 | 12/2002 | Knights et al. |
| 6,851,298 B2 * | 2/2005 | Miura et al. .............. 73/40.5 R |
| 7,087,334 B2 * | 8/2006 | Sugino et al. .................. 429/25 |
| 2001/0001287 A1 | 5/2001 | Ueno et al. |
| 2003/0077495 A1 * | 4/2003 | Scartozzi et al. .............. 429/25 |

FOREIGN PATENT DOCUMENTS

JP A 03-250564 11/1991

* cited by examiner

*Primary Examiner*—Stephen J. Kalafut
(74) *Attorney, Agent, or Firm*—Oliff & Berridge, PLC

(57) ABSTRACT

When a command for stopping electric generation by a fuel cell is issued, shutoff valves are closed (at time t1), and then a time-dependent change in pressure (P) in a closed passage area including the fuel cell is detected. A pressure change speed (dP1, i.e., an inclination of L1) when the pressure (P) is in a first pressure range (Ra) in the vicinity of atmospheric pressure and a pressure change speed (dP2, i.e., an inclination of L2) when the pressure (P) is in a second pressure range (Rb) that is on a high pressure side of the first pressure range (Ra) are detected, and both the pressure change speeds (dP1, dP2) are compared with each other. When a difference between both the pressure change speeds (dP1, dP2) is equal to or larger than a predetermined value (Pc), it is determined that there is a hole in an electrolyte membrane of the fuel cell.

20 Claims, 9 Drawing Sheets

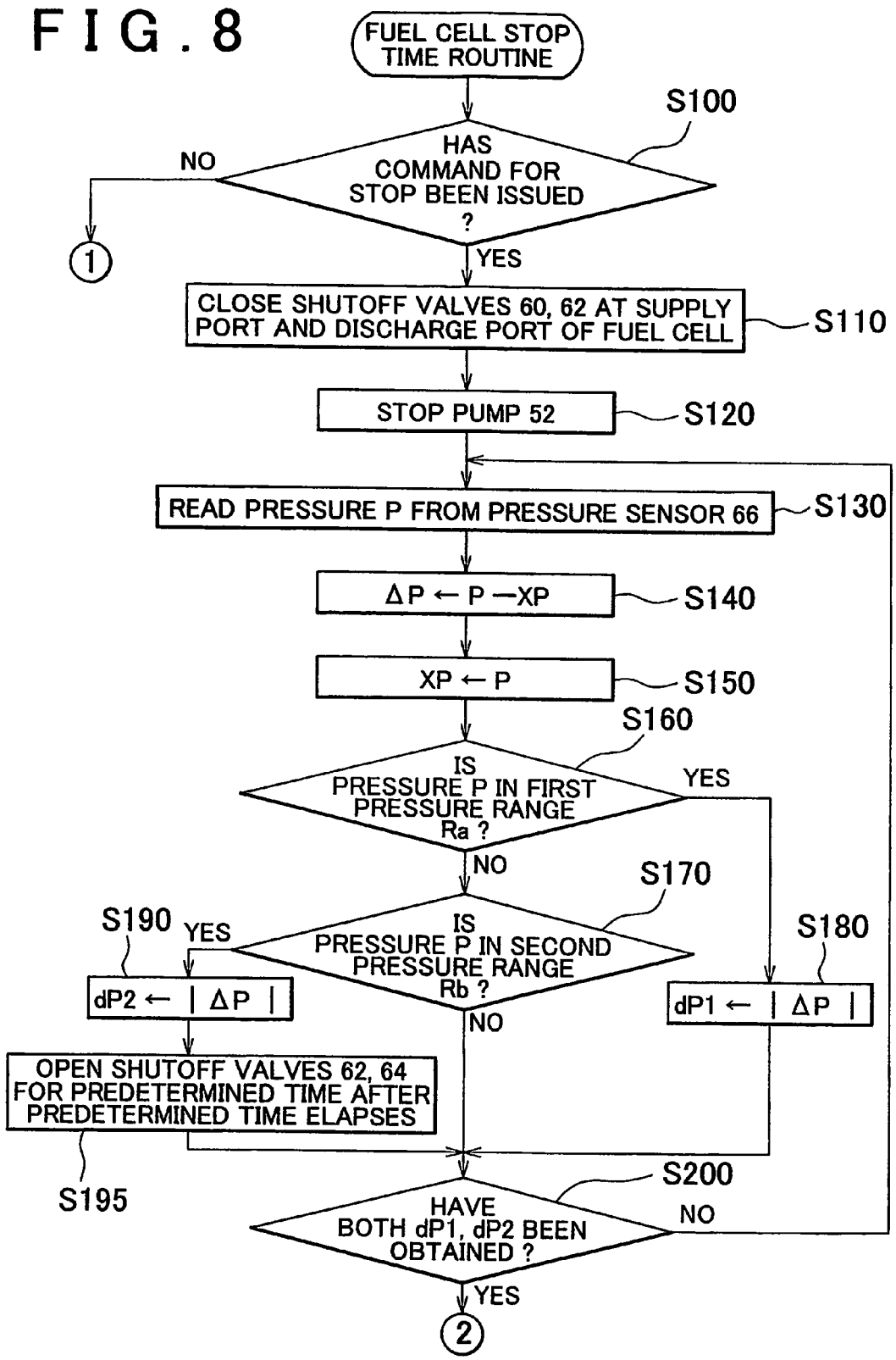

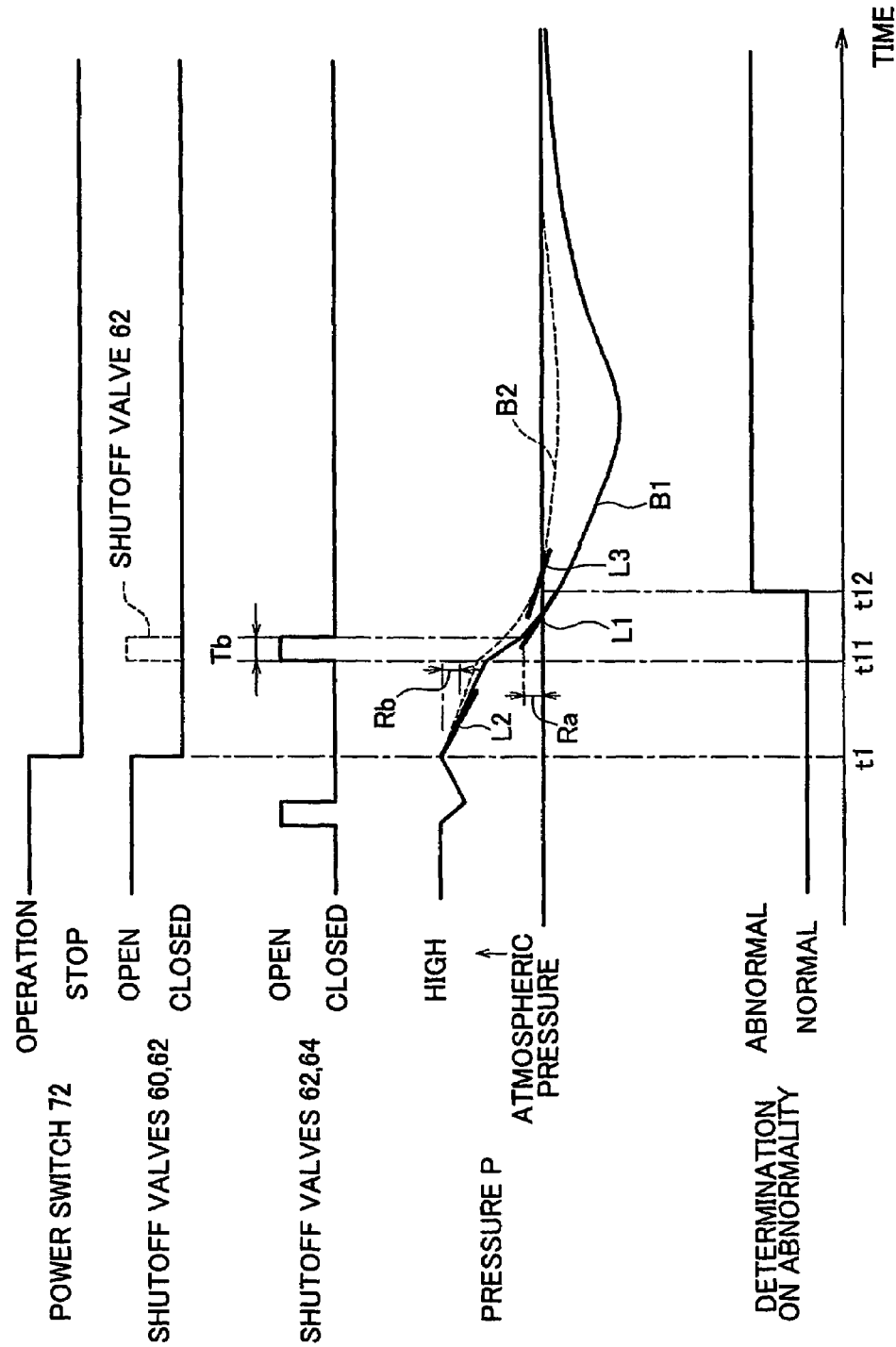

FUEL CELL SYSTEM AND GAS LEAK DETECTION METHOD

FIELD OF THE INVENTION

The invention relates to a technology for detecting leak of hydrogen gas in a fuel cell system.

BACKGROUND OF THE INVENTION

A fuel cell system, which has been placed in practical use, directly converts energy of hydrogen gas into electric energy using electrochemical reaction that occurs in the fuel cell. Therefore, the fuel cell system can obtain electric energy with high conversion efficiency. In this type of fuel cell system, it is necessary to continue to supply hydrogen gas to the fuel cell from a conduit connected to the fuel cell. Since supply of hydrogen gas is important, it is necessary to monitor whether there is leak of hydrogen gas or blockage in the conduit.

As a technology for detecting such leak of hydrogen gas or blockage, there is known a technology in which pressure sensors are provided at plural portions in the conduit connected to the fuel cell, and a pressure value detected by each of the pressure sensors is compared with a reference pressure value that is set at each of the portions at which the pressure sensors are provided (Japanese Patent Laid-Open Publication No. JP-A-3-250564). With this configuration, it is possible to detect gas leak or blockage at each of intervals between plural pressure sensors.

However, in the case where detection is performed only by comparing the measured pressure value and the reference pressure value that is a value at a normal time as disclosed in the aforementioned Japanese Patent Laid-Open Publication No. JP-A-3-250564, it may be wrongly detected that there is gas leak when there is no gas leak. The reason why wrong detection may be made is as follows. Since hydrogen permeates through an electrolyte membrane constituting the fuel cell, a decrease in pressure on a hydrogen electrode side inevitably occurs, and it is difficult to distinguish between this decrease in pressure and a decrease in pressure due to a hole in the electrolyte membrane.

DISCLOSURE OF THE INVENTION

It is an object of the invention to prevent the wrong detection of a gas leak.

A first aspect of the invention relates to a fuel cell system including a fuel cell; a supply passage that supplies hydrogen gas to the fuel cell; a discharge passage that discharges the hydrogen gas from the fuel cell; at least one valve element which is located in a predetermined portion in at least one of the supply passage and the discharge passage, and which closes off a hydrogen passage in the fuel cell; and control means for performing control that closes the at least one valve element. The fuel cell system further includes pressure detection means for detecting pressure in the hydrogen passage; and leak determination means for performing analysis of a change in the pressure detected by the pressure detection means when the at least one valve element is closed by the control means, and determining whether there is leak of the hydrogen gas based on a result of the analysis.

In the fuel cell system, the control means closes the at least one valve element so that the hydrogen passage in the fuel cell is closed. The pressure detection means detects the pressure in the hydrogen passage that is closed. The hydrogen gas in the closed hydrogen passage permeates through the electrolyte membrane to an air electrode side in the fuel cell over time. Then, nitrogen flows from the air electrode side to the hydrogen electrode side. Thus, pressure in the hydrogen passage provided in the fuel cell initially decreases, and then increases. When there is abnormality such as a hole in the electrolyte membrane, the time-dependent change in the pressure is different from that time-dependent change in the pressure at a normal time. Therefore, leak of hydrogen gas can be determined based on the result of analysis by performing analysis of the change in the pressure detected by the pressure detection means using the leak determination means when the at least one valve element is closed.

Accordingly, this fuel cell system can distinguish between the decrease in the pressure due to permeation of hydrogen gas through the electrolyte membrane to the air electrode side in the fuel cell, and the decrease in the pressure due to leak of hydrogen gas. Thus, it is possible to prevent the wrong detection of a gas leak.

The change in the pressure that is analyzed when the at least one valve element is closed by the control means may be a change in the pressure during all of or part of a period since the at least one valve element is closed until the decreased pressure detected by the pressure detection means starts to increase.

In the fuel cell system according to the first aspect of the invention, the at least one valve element may include a first valve element located in the supply passage and a second valve element located in the discharge passage.

In the fuel cell system according to the first aspect of the invention, the leak determination means may determine whether there is leak of the hydrogen gas when the fuel cell is stopped.

In the fuel cell system according to the first aspect of the invention, the leak determination means may include calculation means for obtaining pressure change speeds when the pressure detected by the pressure detection means reaches two different predetermined levels; and first comparative determination means for comparing both the pressure change speeds obtained by the calculation means, and determining that there is the leak when a difference between both the pressure change speeds exceeds a predetermined value.

Since gas permeates through the electrolyte membrane to the air electrode side due to a difference in the gas partial pressure between both the electrode sides, the pressure decreases at a relatively constant speed after the at least one valve element is closed by the control means. Meanwhile, when there is abnormality such as a hole in the electrolyte membrane, the pressure does not decrease at a constant speed. In the fuel cell system having the aforementioned configuration, the pressure change speeds when the pressure reaches two different predetermined levels are compared with each other, and it is determined whether the difference between both the pressure change speeds exceeds the predetermined value, whereby it can be determined whether the pressure decreases at a constant change speed. Accordingly, it is possible to easily determine abnormality such as a hole in the electrolyte membrane.

Each of the two different levels may be set to a value that can be reached during a period since the at least one valve element is closed until the pressure detected by the pressure detection means, which has decreased, starts to increase.

With this configuration, control that closes at least one valve element is performed once, and then the change in the pressure can be analyzed based on the two pressure change speeds. Therefore, control can be easily performed.

One of the two different levels of the pressure may be set to a first pressure range in the vicinity of atmospheric pressure, and the other may be set to a second pressure range which is on a high pressure side of the first pressure range.

With this configuration, when there is abnormality such as a hole in the electrolyte membrane, the pressure change speed in the vicinity of atmospheric pressure is greatly different from the pressure change speed in the vicinity of atmospheric pressure at a normal time. Accordingly, it is possible to accurately determine abnormality such as a hole in the electrolyte membrane.

The fuel cell system may further include pressure reducing means for forcibly reducing the pressure in the hydrogen passage at a certain time between two time points at each of which the pressure change speed is obtained.

With this configuration, the pressure in the hydrogen passage in the fuel cell is sharply reduced between a time point at which the pressure change speed is obtained at first, and a time point at which the pressure change speed is obtained next time. Therefore, the time between the two points can be reduced. Accordingly, determination on gas leak can be performed in a short time.

In the fuel cell system including the pressure reducing means, the pressure reducing means may include discharge control means for opening the second valve element at the certain time between the two time points.

With this configuration, the hydrogen gas in the hydrogen passage in the fuel cell is discharged from the discharge passage, whereby the pressure can be easily reduced.

The pressure reducing means may include electric power control means for causing the fuel cell to generate electric power so that the fuel cell consumes the hydrogen gas in the hydrogen passage at the certain time between the two time points.

With this configuration, the fuel cell consumes the hydrogen gas in the hydrogen passage. Therefore, the pressure can be easily reduced.

The fuel cell system in which each of the two different levels of the pressure is set to a value that can be reached during the period may be installed in a moving object that includes a secondary battery in addition to the fuel cell as a driving source. The fuel cell system may further include means for obtaining, in advance, a pressure change speed when the pressure is in the second pressure range while operation of the fuel cell is stopped and the moving object is operated using only the secondary battery.

With this configuration, the pressure change speed when the pressure is in the second pressure range can be obtained in advance while the moving object is operated. Therefore, the time required for determining gas leak can be reduced. Particularly, in the fuel cell system including the pressure reducing means, the time required for determining gas leak can be further reduced.

The fuel cell system that includes the leak determination means including the calculation means and the first comparative determination means may further include pressure applying means for applying pressure to the hydrogen passage in the fuel cell. One of the two different levels of the pressure may be set to a first pressure value that can be reached when the pressure applying means applies pressure to the hydrogen passage, and the other may be set to a second pressure value that can be reached when the pressure applying means applies pressure to the hydrogen passage again.

With this configuration, the time points at which the pressure change speeds are obtained are forcibly advanced by applying pressure to the hydrogen passage.

In the fuel cell system according to the first aspect of the invention, the leak determination means may include minimum pressure value detection means for detecting a minimum pressure value when the pressure detected by the pressure detection means is lowest; and second comparative determination means for comparing the detected minimum pressure value and a predetermined value, and determining that there is the leak when it is determined that the minimum pressure value is higher than the predetermined value.

The pressure on the hydrogen electrode side becomes negative due to permeation of hydrogen through the electrolyte membrane at a normal time when there is no hole in the electrolyte membrane. On the other hand, when there is a hole or the like in the electrolyte membrane, the pressure on the hydrogen electrode side is not likely to become negative pressure. In the fuel cell having the aforementioned configuration, the minimum pressure value is compared with the predetermined value, and it can be determined that there is leak when it is determined that the minimum pressure value is higher than the pressure value. Accordingly, determination on abnormality can be easily performed.

The fuel cell system that includes the leak determination means including the calculation means and the second comparative determination means may further include pressure reducing means for forcibly reducing the pressure in the hydrogen passage at a certain time during a period since the at least one valve element is closed by the control means until the minimum pressure value is detected by the minimum pressure value detection means.

With this configuration, the pressure in the hydrogen passage is sharply reduced before the minimum pressure value is detected. Therefore, determination on gas leak can be performed in a short time.

The pressure reducing means may include discharge control means for opening the second valve element at the certain time during the period since the at least one valve element is closed by the control means until the minimum pressure value is detected by the minimum pressure value detection means.

With this configuration, the hydrogen gas in the hydrogen passage is discharged from the discharge passage. Therefore, the pressure can be easily reduced.

The pressure reducing means may include electric power control means for causing the fuel cell to generate electric power so that the hydrogen gas in the hydrogen passage is consumed at the certain time during the period since the at least one valve element is closed by the control means until the minimum pressure value is detected by the minimum pressure value detection means.

With this configuration, the fuel cell consumes the hydrogen gas in the hydrogen passage. Therefore, the pressure can be easily reduced.

A second aspect of the invention relates to a gas leak detection method for detecting hydrogen gas leak in a fuel cell system which includes a fuel cell; a supply passage that supplies hydrogen gas to the fuel cell; a discharge passage that discharges the hydrogen gas from the fuel cell; and at least one valve element which is located in a predetermined portion in at least one of the supply passage and the discharge passage, and which closes off a hydrogen passage in the fuel cell. The detection method includes the steps of (a) closing the at least one valve element; (b) detecting pressure in the hydrogen passage in the fuel cell; and (c) performing analysis of a change in the pressure detected in the step (b) when the at least one valve element is closed in the step (a), and determining whether there is leak of the hydrogen gas based on a result of the analysis.

The gas leak detection method thus configured has the same effects as those of the fuel cell system according to the first aspect of the invention. Therefore, it is possible to prevent the wrong detection of a gas leak.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 8 is a flowchart showing a fuel cell stop time routine according to a third embodiment of the invention; and FIG. 9 is a timing chart describing processes of the fuel cell stop time routine according to the third embodiment of the invention.

DETAILED DESCRIPTION OF THE PREFERRED EMBODIMENTS

First Embodiment

Figure 1:
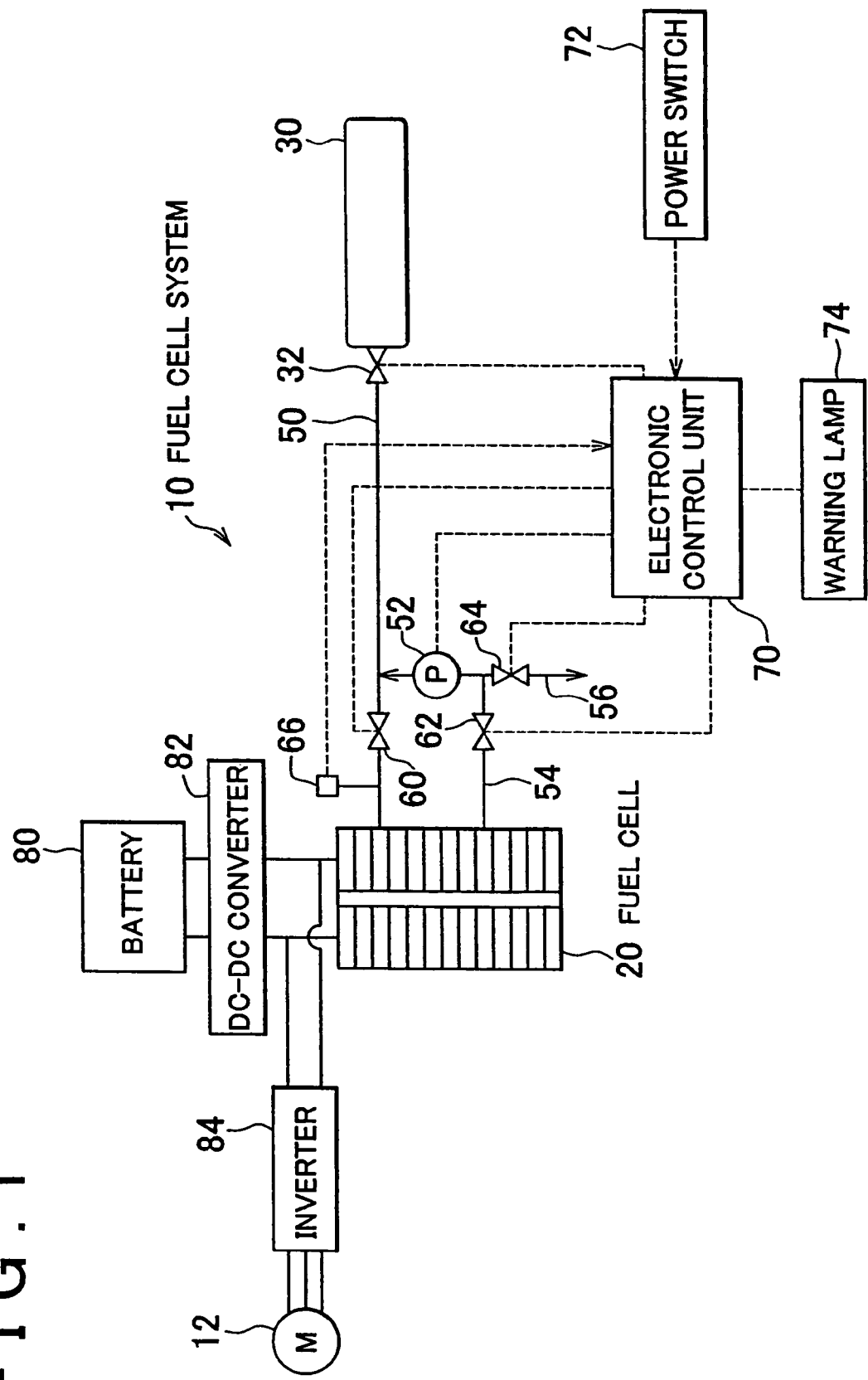
FIG. 1 is a diagram showing a configuration of an in-vehicle power output system which includes a fuel cell system 10 according to a first embodiment of the invention.

FIG. 1 is a diagram showing a configuration of an in-vehicle power output system which includes a fuel cell system 10 according to a first embodiment of the invention. The in-vehicle power output system according to the embodiment of the invention constitutes a power output apparatus that is installed in a vehicle such as an automobile. The in-vehicle power output system mainly includes a fuel cell system 10, and a drive motor 12 that outputs power using electric power generated by the fuel cell system 10.

The fuel cell system 10 includes a fuel cell 20 that receives supply of hydrogen gas and generates electric power, and a high pressure hydrogen gas tank 30 that supplies hydrogen gas to the fuel cell 20.

In the fuel cell 20, supply of air as oxidizing gas is received in addition to hydrogen gas containing hydrogen, electrochemical reaction occurs at the hydrogen electrode and the air electrode according to the reaction equation described below, and electric power is generated. That is, when hydrogen gas is supplied to the hydrogen electrode and air is supplied to the air electrode, reaction occurs on the hydrogen electrode side according to an equation (1), and reaction occurs on the air electrode side according to an equation (2). In the entire fuel cell, reaction occurs according to an equation (3).

$$H_2 \rightarrow 2H^+ + 2e^- \quad (1)$$

$$2H^+ + 2e^- + (1/2)O_2 \rightarrow O_2 \rightarrow H_2O \quad (2)$$

$$H_2 + (1/2)O_2 \rightarrow H_2O \quad (3)$$

Also, the fuel cell 20 includes a fuel cell stack which is formed by stacking plural unit cells. One unit cell includes an electrolyte membrane (not shown), a hydrogen electrode and an air electrode that are diffusion electrodes (not shown), and two separators (not shown). The electrolyte membrane is sandwiched between the hydrogen electrode and the air electrode. The electrolyte membrane, the hydrogen electrode, and the air electrode are sandwiched between the two separators on both sides. Concavities and convexities are formed on both sides of each of the separators. Thus, gas passages in the unit cell are formed between one of the separators and the hydrogen electrode, and between the other separator and the air electrode. The hydrogen gas, which is supplied as described above, flows in a hydrogen passage in the unit cell, which is formed between the separator and the hydrogen electrode. Air flows in an air passage in the unit cell, which is formed between the separator and the air electrode.

High pressure hydrogen gas is stored inside a high pressure hydrogen gas tank 30. When a shutoff valve 32 attached to the root of the high pressure hydrogen gas tank 30 is opened, hydrogen gas at a pressure of approximately 20 to 35 MPa is emitted. The fuel cell system 10 includes a mainstream passage 50, a circulation passage 54, and a discharge passage 56. The mainstream passage 50 serves as a passage for hydrogen, and extends from an emission port of the high pressure hydrogen gas tank 30 to a supply port of the fuel cell 20. The circulation passage 54 that returns the hydrogen gas from a discharge port of the fuel cell 20 to the mainstream passage 50 through a pump 52. The discharge passage 56 discharges the circulated hydrogen gas. The mainstream passage 50 can be regarded as a supply passage according to the invention, and the circulation passage 54 can be regarded as a first discharge passage according to the invention.

In the mainstream passage 50, a shutoff valve 60 is disposed at the supply port of the fuel cell 20. In the circulation passage 54, a shutoff valve 62 is disposed at the discharge port of the fuel cell 20. In the discharge passage 56, a shutoff valve 64 is disposed. The shutoff valves 60, 62 can be regarded as "at least one valve element which closes off a hydrogen passage in the fuel cell" according to the invention. Further, a pressure sensor 66 is provided on a downstream side of the shutoff valve 60 in the mainstream passage 50. The pressure sensor 66 can be regarded as pressure detection means according to the invention. The position at which the pressure sensor 66 is provided does not need to be limited to this position, and the pressure sensor 66 may be provided at any position as long as the pressure sensor 66 can detect the pressure in the hydrogen passage. Thus, the pressure sensor 66 may be provided directly in the hydrogen passage. In the embodiment, the pressure sensor 66 can detect both positive pressure and negative pressure.

An air passage (not shown) is connected to the fuel cell 20. Outside air that is taken from an air cleaner (not shown) is supplied via the passage.

Also, the fuel cell system 10 includes an electronic control unit 70. The electronic control unit 70 is configured as a microcomputer including a CPU, RAM and ROM therein. The aforementioned pump 52, the shutoff valves 32, 60, 62, 64 and the pressure sensor 66 are electrically connected to the electronic control unit 70. Further, a power switch 72 and a warning lamp 74 are electrically connected to the electronic control unit 70. The power switch 72 gives commands for operating/stopping the entire in-vehicle power output system (the entire system) including the fuel cell system 10. The power switch 72 is operated by a driver. The warning lamp 74 provides the driver with a warning concerning failure of the fuel cell system 10.

When the electronic control unit 70 receives the command for operating the entire in-vehicle power output system from the power switch 72, the electronic control unit 70 opens the shutoff valves 32, 60, 62 (keeping the shutoff valve 64 closed), operates the pump 52, and operates the fuel cell 20. Also, when the electronic control unit 70 receives the command for stopping the entire in-vehicle power output system from the power switch 72, the electronic control unit 70 closes the shutoff valves 32, 60, 62, stops the pump 52, and stops the fuel cell 20. When the fuel cell 20 is stopped, it is determined whether there is leak of hydrogen gas. When there is leak, a warning lamp 74 is lit.

The in-vehicle power output system in the embodiment of the invention mainly includes, as an electric system, a battery 80, a DC/DC converter 82, and an inverter 84, in addition to the aforementioned drive motor 12, the fuel cell 20, and the electronic control unit 70.

The fuel cell 20 and the inverter 84 are connected to the battery 80 in parallel through the DC/DC converter 82. Electric power generated by the fuel cell 20 is supplied to the inverter 84. In some cases, the electric power generated by the fuel cell 20 is supplied also to the battery 80. Electric power from the battery 80 is supplied to the inverter 84 through the DC-DC converter 82.

The DC-DC converter 82 increases voltage output from the battery 80, and applies electric current to the inverter 84 in parallel. Also, the DC-DC converter 82 can adjust direct-current voltage input from the fuel cell 20 so as to output the adjusted direct-current voltage to the battery 80. Owing to the function of the DC-DC converter 82, charge/discharge of the battery is performed. The inverter 84 drives the drive motor 12 using electric power supplied from the fuel cell 20 and the battery 80. For example, the drive motor 12 is composed of a three-phase synchronous motor, and generates torque at an axle (not shown).

The aforementioned electronic control unit 70 controls operation of the DC-DC converter 82 and operation of the inverter 84. The electronic control unit 70 controls switching of the inverter 84, and outputs three-phase alternating current to the drive motor 12 according to required power. The electronic control unit 70 controls operation of the fuel cell 20 and operation of the DC-DC converter 72 such that electric power is supplied according to required power. Operation of the fuel cell 20 is controlled by controlling the shutoff valves 32, 60, 62, 64, the pump 52, and the like included in the fuel cell system 10.

Figure 2:
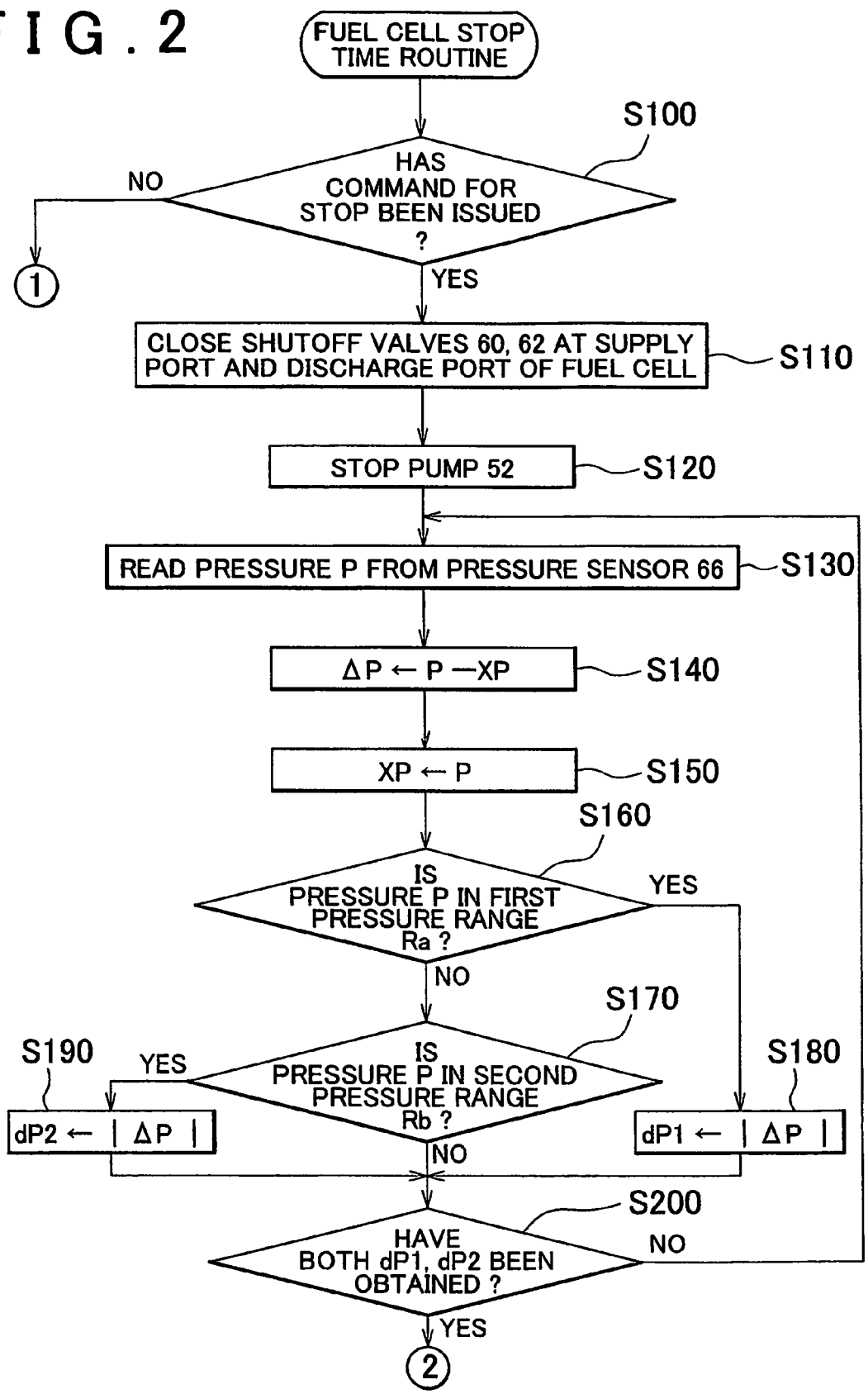
FIG. 2 is a flowchart showing a first half of a fuel cell stop time routine.
Figure 3:
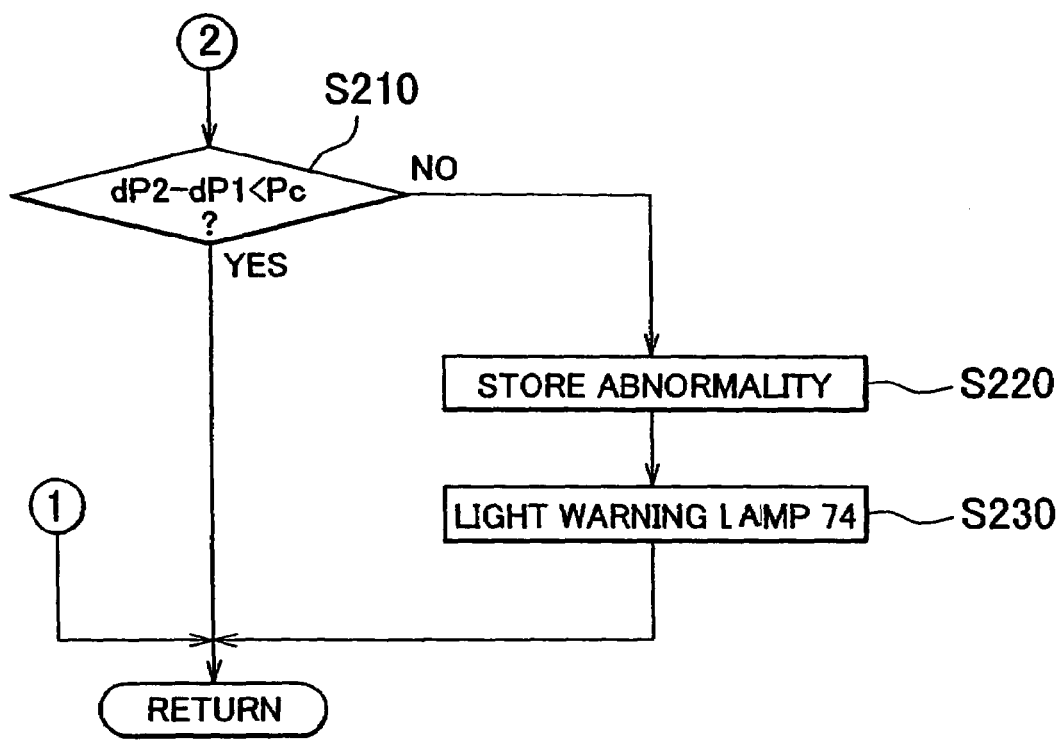
FIG. 3 is a flowchart showing a second half of a fuel cell stop time routine.

Next, description will be made of control that is performed by the CPU of the electronic control unit 70 when the fuel cell is stopped. FIG. 2 and FIG. 3 show a flowchart of a routine when the fuel cell is stopped (hereinafter, referred to as "fuel cell stop time routine"). The routine is performed based on interruption at predetermined time intervals. As shown in FIG. 1, after the routine is started, first, the CPU determines whether the command for stopping the in-vehicle power output system has been issued from the power switch 82 (step S100). When it is determined that the command for stopping the in-vehicle power output system has not been issued, it is determined that the fuel cell 20 does not need to be stopped, afterwhich the control routine proceeds to "return", and is terminated.

Meanwhile, when it is determined that the command for stopping the in-vehicle power output system has been issued in step S100, the CPU closes the shutoff valves 60, 62 provided at the supply port and the discharge port of the fuel cell 20 (step S110), and stops the pump 52 (step S120). Then, the CPU performs a process of reading pressure P detected by the pressure sensor 66 (step S130). Since the shutoff valves 60, 62 are closed in step S100, an area from the shutoff valve 60 in the mainstream passage 50 to the shutoff valve 62 in the circulation passage 54 is closed, that is, an area composed of an area downstream of the shutoff valve 60 in the mainstream passage 50 and an area upstream of the shutoff valve 62 in the circulation passage 54 is closed. As a result, the hydrogen passage provided in the fuel cell 20 is closed. In step S130, the pressure sensor 66 detects the pressure in the closed hydrogen passage.

After the process in step S130 is performed, the CPU obtains a pressure change $\Delta P$ by subtracting pressure XP that was read when the process in step S130 was performed previous time (hereinafter, referred to as "previous time pressure XP") from pressure P that is read when the process in step S130 is performed this time (step S140). Subsequently, the pressure P read in step S130 is stored as the previous time pressure XP (step S150).

Subsequently, the CPU determines whether the pressure P read in step S130 is in a first pressure range Ra or in a second pressure range Rb, or whether the pressure P is neither in the first pressure range Ra nor in the second pressure range Rb (steps S160, S170). The first pressure range Ra is in the vicinity of atmospheric pressure. For example, the first pressure range Ra is a range from a standard atmospheric pressure value to a pressure value obtained by adding a slight pressure value (for example, 15 kPa) to the standard atmospheric pressure value. The second pressure range Rb is on the high pressure side of the first pressure range Ra. For example, the second pressure range Rb is a range of 150 to 230 kPa.

When it is determined that the pressure P is in the first pressure range Ra in step S160, the CPU stores an absolute value of the pressure change $\Delta P$ obtained in step S140 as a variable dP1 (step S180). When it is determined that the pressure P is in the second pressure range Rb in step S170, the CPU stores an absolute value of the pressure change $\Delta P$ obtained in step S140 as a variable dP2 (step S190). After the process in step S180 or S190 is performed, the routine proceeds to step S200.

When negative determinations are made in both steps S160 and S170, the routine proceeds to step S200. In step S200, the CPU determines whether the processes in both step S180 and step S190 have been performed, that is, both the variables dP1 and dP2 have been obtained. When a negative determination is made in step 200, the routine returns to step S130, and the processes in step S130 to step S200 are repeatedly performed. It is preferable that the pressure P should be detected at relatively long time intervals instead of extremely short time intervals, by delaying detection of the pressure P in step S130 by a predetermined time (for example, 5 seconds) when the routine returns to step S130.

Figure 4:
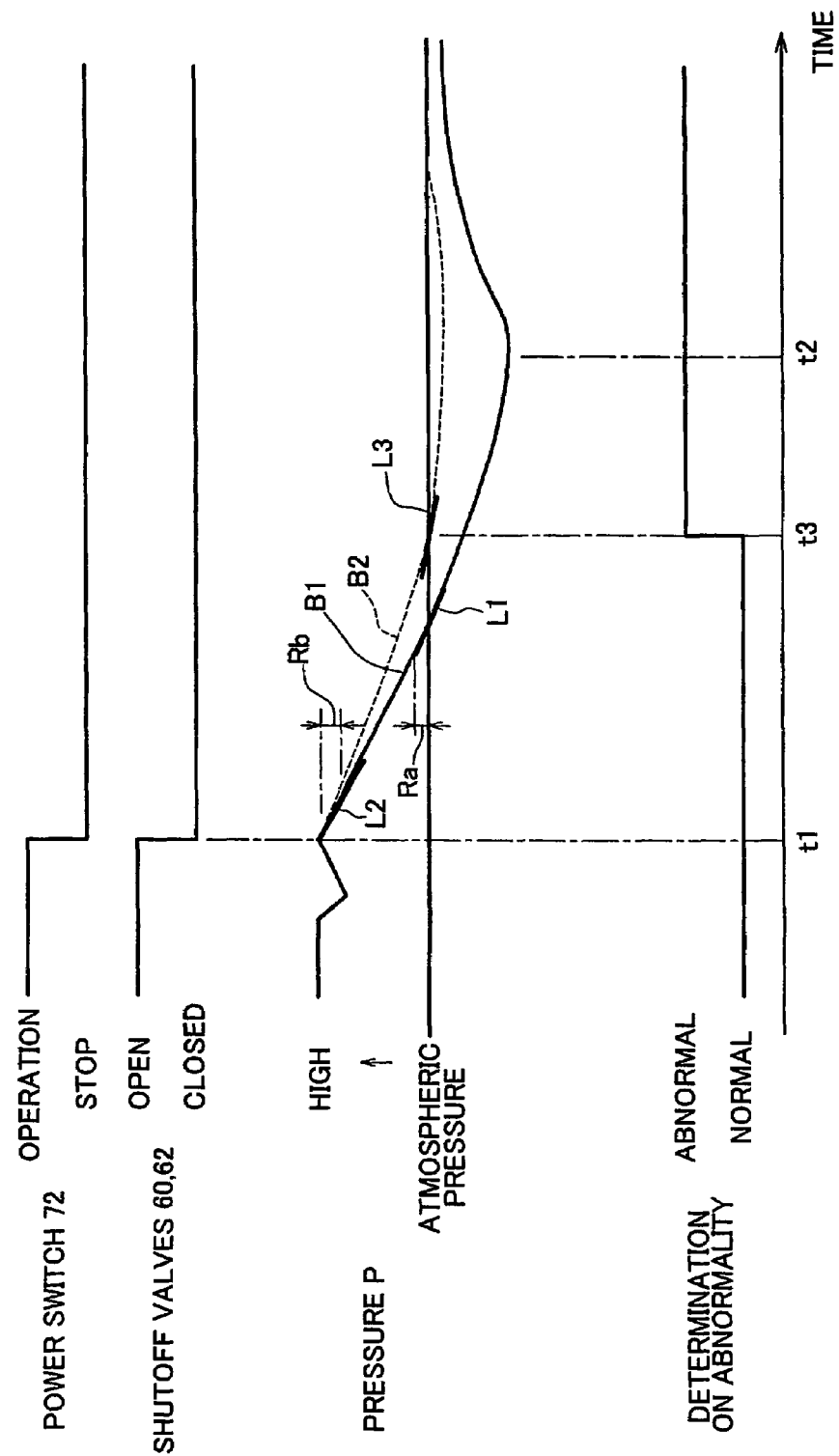
FIG. 4 is a timing chart describing processes of the fuel cell stop time routine.

FIG. 4 is a timing chart describing the processes of the fuel cell stop time routine. As shown in the timing chart, when the state of the power switch 72 is changed from the operation state to the stop state, the shutoff valves 60, 62 that are provided at the supply port and the discharge port of the fuel cell 20 are closed in step S110 (time t1). The pressure P detected by the pressure sensor 66 starts to decrease gradually at time t1, as shown in a solid line B1. As described above, though the hydrogen passage in the fuel cell is closed by closing the shutoff valves 60, 62, the pressure P detected by the pressure sensor 66 is not maintained at a constant value, and gradually decreases. This is because hydrogen gas flows from the hydrogen electrode to the air electrode since hydrogen can permeate through the electrolyte membrane constituting the fuel cell 20.

Since the pressure P changes such that the hydrogen partial pressure on the hydrogen electrode side becomes equal to the hydrogen partial pressure on the air electrode side the pressure P becomes lower than atmospheric pressure and becomes negative pressure. Then, when the pressure P reaches a certain minimum point, the pressure P starts to increase (time t2). This is because a significant amount of nitrogen moves from the air electrode side to the hydrogen electrode side after the amount of hydrogen gas permeating through the electrolyte membrane decreases to a certain extent since a speed at which nitrogen permeates through the electrolyte membrane is lower than a speed at which hydrogen permeates through the electrolyte membrane. Finally, the pressure P becomes equal to the pressure on the air electrode side, that is, the atmospheric pressure. When the pressure P is detected by the pressure sensor 66, the shutoff valves 60, 62 are closed in order to prevent hydrogen gas from being delivered from the high pressure hydrogen gas tank 30 connected to the mainstream passage 50.

Examples of the first pressure range Ra and the second pressure range Rb that are used for making determinations in step S160 and step S170 are shown in FIG. 4. When the pressure P detected by the pressure sensor 66 decreases to the second pressure range Rb, an absolute value of the pressure change ΔP obtained in step S140 is stored as a variable dP2 in step S190. The value of the variable dP2 is a change speed of the pressure P (a change in the pressure P per unit time) when the pressure P reaches the second pressure range Rb. The value of the variable dP2 corresponds to the inclination of a solid line L2 in FIG. 4.

When the pressure P further decreases to reach the first pressure range Ra in the vicinity of atmospheric pressure, an absolute value of the pressure change ΔP obtained in step S140 is stored as the variable dP1 in step S180. The value of the variable dP1 is a change speed (a change in the pressure per unit time) when the pressure P reaches the first pressure range Ra. The value of the variable dP1 corresponds to the inclination of a solid line L1 in FIG. 4.

After finishing the process in step S200, the CPU performs the process in step S210 in FIG. 3. In step S210, it is determined whether a value obtained by subtracting the variable dP1 from the variable dP2 is lower than a predetermined value Pc, whereby it is determined whether the variable dP2 is substantially equal to the variable dP1. The predetermined value Pc is, for example, 4 kPa. The predetermined value Pc may vary depending on detection accuracy of the pressure sensor 66, and the like. When an affirmative determination is made, that is, it is determined that both the variable dP2 and the variable dP1 are substantially equal in step S210, the control routine proceeds to "return", and the routine is terminated.

As shown in FIG. 4, the pressure P decreases at a relatively constant inclination (pressure change speed), as shown by the solid line B1. This is because hydrogen permeates through the electrolyte membrane at a constant speed. Meanwhile, when there is a hole in the electrolyte membrane, the pressure P changes as shown by a dashed line B2 in FIG. 4. When there is a hole in the electrolyte membrane, hydrogen gas flows to the air electrode side through the hole such that the pressure on the hydrogen electrode side becomes equal to the pressure on the air electrode side. When the pressure P is positive pressure, the hydrogen gas flows through the hole and permeates through the electrolyte membrane at the same time. When the pressure P come close to atmospheric pressure, the flow of the hydrogen gas through the hole is stopped, and the pressure P decreases due to only the permeation of the hydrogen gas through the electrolyte membrane. Therefore, a pressure decrease speed at which the pressure P decreases when the pressure P starts to decrease is higher than a pressure decrease speed when the pressure P comes close to atmospheric pressure.

That is, when there is no hole in the electrolyte membrane, the pressure P changes as shown by a solid line B1 in FIG. 4, and the pressure decrease speed when the pressure P starts to decrease is substantially equal to the pressure decrease speed when the pressure P is close to atmospheric pressure. Meanwhile, when there is a hole in the electrolyte membrane, the pressure P changes as shown by the dashed line B2 in FIG. 4, and the pressure decrease speed when the pressure P starts to decrease is greatly different from the pressure decrease speed when the pressure P is close to atmospheric pressure. The inclination of the solid line L3 in FIG. 4 shows the pressure decrease speed in the vicinity of atmospheric pressure, and corresponds to the variable dP1 obtained in step S190 when there is a hole.

The aforementioned process in step S210 is performed in order to determine whether the pressure decrease speed when the pressure P starts to decrease is substantially equal to the pressure decrease speed when the pressure P is close to atmospheric pressure. When an affirmative determination is made, that is, when it is determined that both the pressure decrease speeds are substantially equal, the CPU determines that there is no hole in the electrolyte membrane, and the routine proceeds to "Return". Meanwhile, a negative determination is made in step S210, that is, when it is determined that both the pressure decrease speeds are not equal, the CPU determines that there is a hole in the electrolyte membrane, memorizes that a portion where there is abnormality (step S220) is the electrolyte membrane, and lights the warning lamp 74 (step S230). Determination on abnormality is made at time t3 in FIG. 4. After the process in step S230 is performed, the routine proceeds to "return".

As described above, in the fuel cell system 10 according to the embodiment of the invention, the hydrogen passage in the fuel cell 20 is closed by closing the shutoff valves 60, 62 when the command for stopping the entire in-vehicle power output system including the fuel cell system 10 is issued. Then, detection is performed for obtaining each of the pressure change speed dP1 when the pressure P in the closed hydrogen passage reaches the first pressure range Ra in the vicinity of atmospheric pressure and the pressure change speed dP2 when the pressure P reaches the second pressure range Rb that is on the high pressure side of the first pressure range Ra, and both the pressure change speeds dP1 and dP2 are compared with each other. When the difference between the pressure change speeds dP1, dP2 is equal to or larger than the predetermined value Pc, it is determined that there is a hole in the electrolyte membrane in the fuel cell 20.

Accordingly, in the fuel cell system 10, a decrease in the pressure due to permeation of hydrogen gas through the electrolyte membrane of the fuel cell 20 to the air electrode side is prevented from being wrongly determined as a decrease in the pressure due to abnormality such as a hole in the electrolyte membrane. Accordingly, it is possible to the prevent wrong detection of a gas leak.

Figure 5:
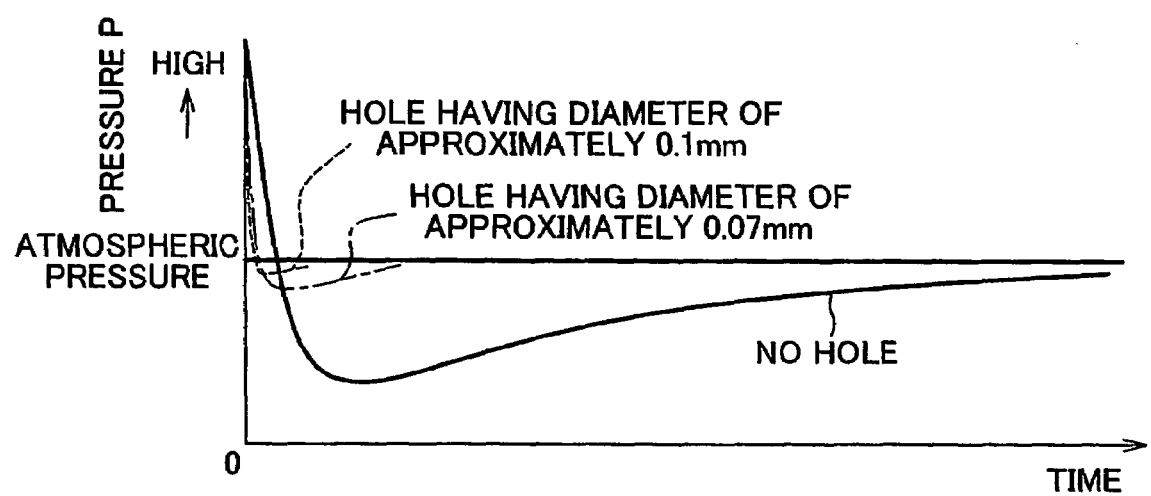
FIG. 5 is a graph showing an example in which a time-dependent change in pressure after the fuel cell is stopped varies according to size of a hole in an electrolyte membrane.

FIG. 5 is a graph showing an example in which a time-dependent change in pressure after the fuel cell is stopped varies according to size of a hole in the electrolyte membrane. As shown in FIG. 5, as the diameter of the hole in the electrolyte membrane becomes larger, the pressure change speed at which the pressure P decreases becomes higher, and the minimum value of the pressure becomes smaller. In the first embodiment, the time-dependent change during a period in which the pressure P decreases and then starts to increase is analyzed by detecting the pressure change speeds dP1 in the first pressure range Ra in the vicinity of atmospheric pressure and the pressure change speeds dP2 in the second pressure range Rb that is on the high pressure side of the first pressure range Ra. Thus, even an extremely small hole in the electrolyte membrane can be detected. The timing chart in FIG. 4 shows a case where the hole in the electrolyte membrane is extremely small, and there is only a small difference between the pressure change speed when there is a hole in the electrolyte membrane and the pressure change speed when there is no hole in the electrolyte membrane. For the sake of convenience, in the timing chart in FIG. 4, the pressure change speed at which the pressure decreases is high even when the pressure P starts to decrease in the case where there is no hole in the electrolyte membrane, as compared with the case where there is a hole in the electrolyte membrane. In reality, however, the pressure change speed at which the pressure decreases is high when the pressure P starts to decrease in the case where there is a hole in the electrolyte membrane, as compared with the case where there is no hole in the electrolyte membrane.

Next, a modified example of the first embodiment of the invention will be described.

(1) In the first embodiment of the invention, when the command for stopping the entire in-vehicle power output system is received from the power switch 72, operation of the fuel cell 20 is stopped, and leak of hydrogen gas is detected. Instead, configuration may be such that when there is a request for stopping operation of the fuel cell 20 according to the operating state of the vehicle, operation of the fuel cell 20 is stopped and leak of hydrogen gas is detected. In the case where the battery 80 is provided in addition to the fuel cell 20 as the driving source as in the first embodiment, the fuel cell 20 may be stopped, and the vehicle may run using only the battery 80. In this case, when there is a request for stopping operation of the fuel cell 20, operation of the fuel cell 20 is stopped and leak of hydrogen gas is detected. Also, a stop request for stopping operation of the fuel cell 20 may be a stop command from a switch operated by the driver. The power switch 72 does not necessarily need to give commands for operating/stopping the entire in-vehicle power output system including the fuel cell system 10. The power switch 72 may give commands for operating/stopping only the fuel cell.

(2) In the first embodiment of the invention, each of the pressure change speeds dP1, dP2 obtained at two time points, that is, when the pressure P reaches the first pressure range Ra in the vicinity of atmospheric pressure, and when the pressure P reaches the second pressure range Rb that is on the high pressure side of the first pressure range Ra. The pressure ranges Ra, Rb are set in order to prevent wrong detection. However, pressure ranges do not necessarily need to be set. Instead, certain predetermined pressure values Pa, Pb may be set. The pressure value Pa is the atmospheric pressure value or a pressure value in the vicinity of atmospheric pressure. The pressure value Pb is a pressure value which is higher than the pressure value Pa. Also, the time points at which the pressure change speeds are detected do not necessarily need to be determined based on the pressure values, and may be determined based on elapsed time. For example, the change speed of the pressure P may be obtained first after the elapse of a predetermined time, which is set considering a response delay time period since the shutoff valves 60, 62 are closed until the pressure P actually starts to decrease. Then, the pressure change speed may be obtained next when the pressure P reaches the first pressure range Ra in the vicinity of atmospheric pressure.

Also, in the embodiment of the invention, the first pressure range Ra is in the vicinity of atmospheric pressure. The first pressure range Ra does not necessarily need to be in the vicinity of atmospheric pressure. For example, the first pressure range may be a predetermined negative pressure range in the vicinity of atmospheric pressure. In brief, the two time points at which the pressure change speeds are detected may be any two time points as long as the two time points are in a period since the shutoff valves 60, 62 are closed and the pressure P starts to decrease until the pressure P starts to increase.

(3) In the first embodiment of the invention, the pressure change speed dP1 is obtained using a difference between two detection values detected by the pressure sensor when the pressure P reaches the first pressure range Ra in the vicinity of atmospheric pressure. The pressure change speed dP2 is obtained using a difference between two detection values detected by the pressure sensor when the pressure P reaches the second pressure range Rb that is on the high pressure side of the first pressure range Ra. Instead, the configuration may be as follows. A time period Tm1 since the pressure P reaches the first pressure range Ra until the pressure P changes so as to be outside the first pressure range Ra is measured, and the pressure change speed dP1 is obtained by dividing the first pressure range Ra by the time period Tm1. A time period Tm2 since the pressure P reaches the second pressure range Rb until the pressure P changes so as to be outside the second pressure range Rb, and the pressure change speed dP2 is obtained by dividing the second pressure range Rb by the time period Tm2. With this configuration, the accuracy of the pressure change speeds dP1, dP2 can be improved, and accordingly, the accuracy of detecting gas leak can be improved.

Second Embodiment

A second embodiment of the invention will be described. The second embodiment is different from the first embodiment, only in the processes of the fuel cell stop time routine, which is performed by the CPU of the electronic control unit 70. The configurations of hardware and software excluding the routine are the same. Components which are the same as those in the first embodiment are denoted by the same reference numerals.

Figure 6:
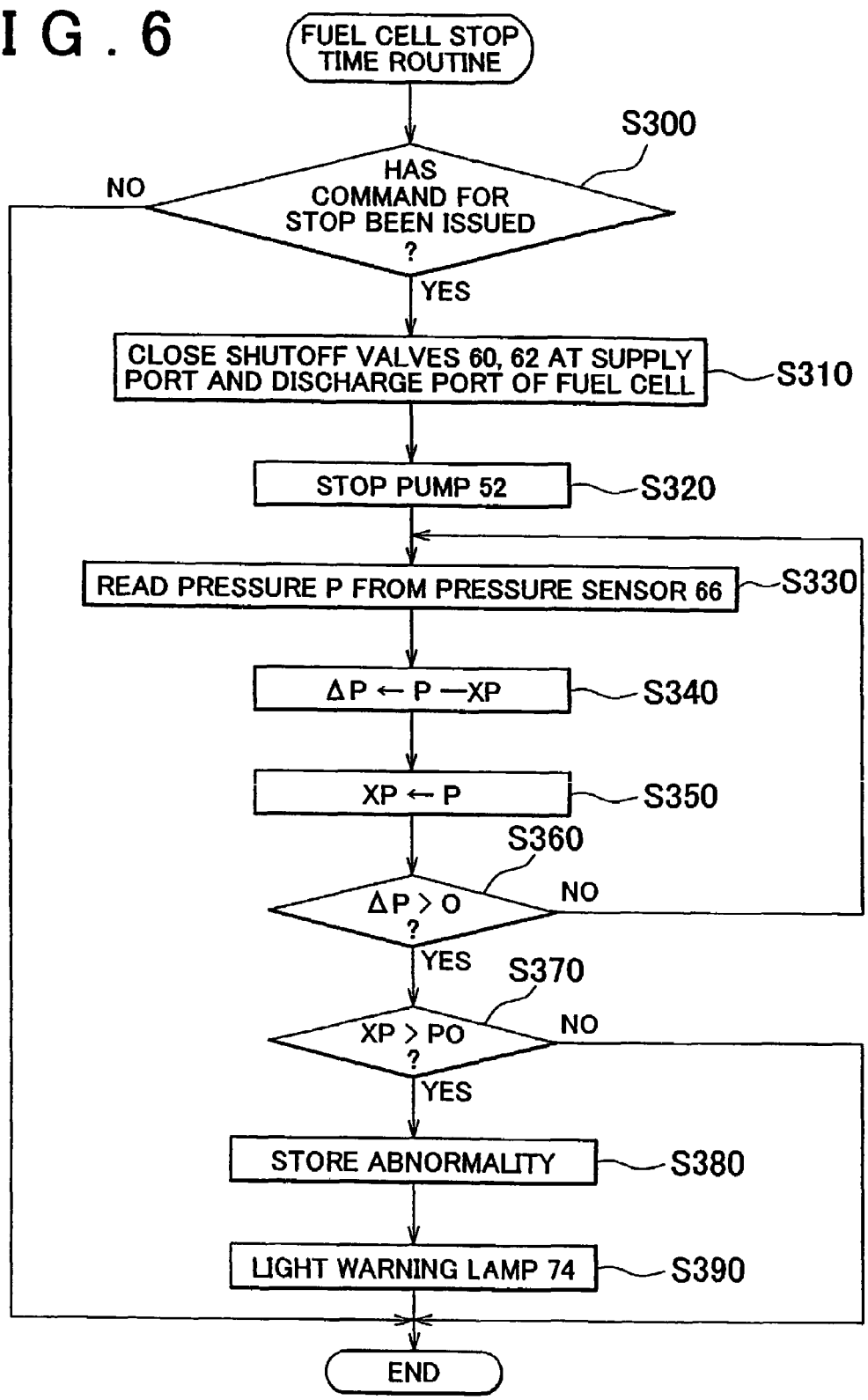
FIG. 6 is a flowchart showing a fuel cell stop time routine according to a second embodiment of the invention.

FIG. 6 is a flowchart showing a fuel cell stop time routine according to a second embodiment of the invention. The routine is performed based on interruption at predetermined time intervals. In FIG. 6, step S300 to step S350 are the same as step S100 to step S150 in the first embodiment of the invention.

After the process in step S350 is performed, the CPU determines whether the pressure change ΔP obtained in step S340 is larger than the value 0 (step S360). When a negative determination is made, that is, when it is determined that the pressure change ΔP is smaller than the value 0, the routine returns to step S330, and the processes in step S330 to S360 are repeatedly performed. Meanwhile, when it is determined that the pressure change ΔP is larger than the value 0 in step S360, the routine proceeds to step S370. In step S370, it is determined whether the previous time pressure XP obtained in step S350 is higher than a predetermined value P0. The predetermined value P0 is, for example, 80 kPa.

Figure 7:
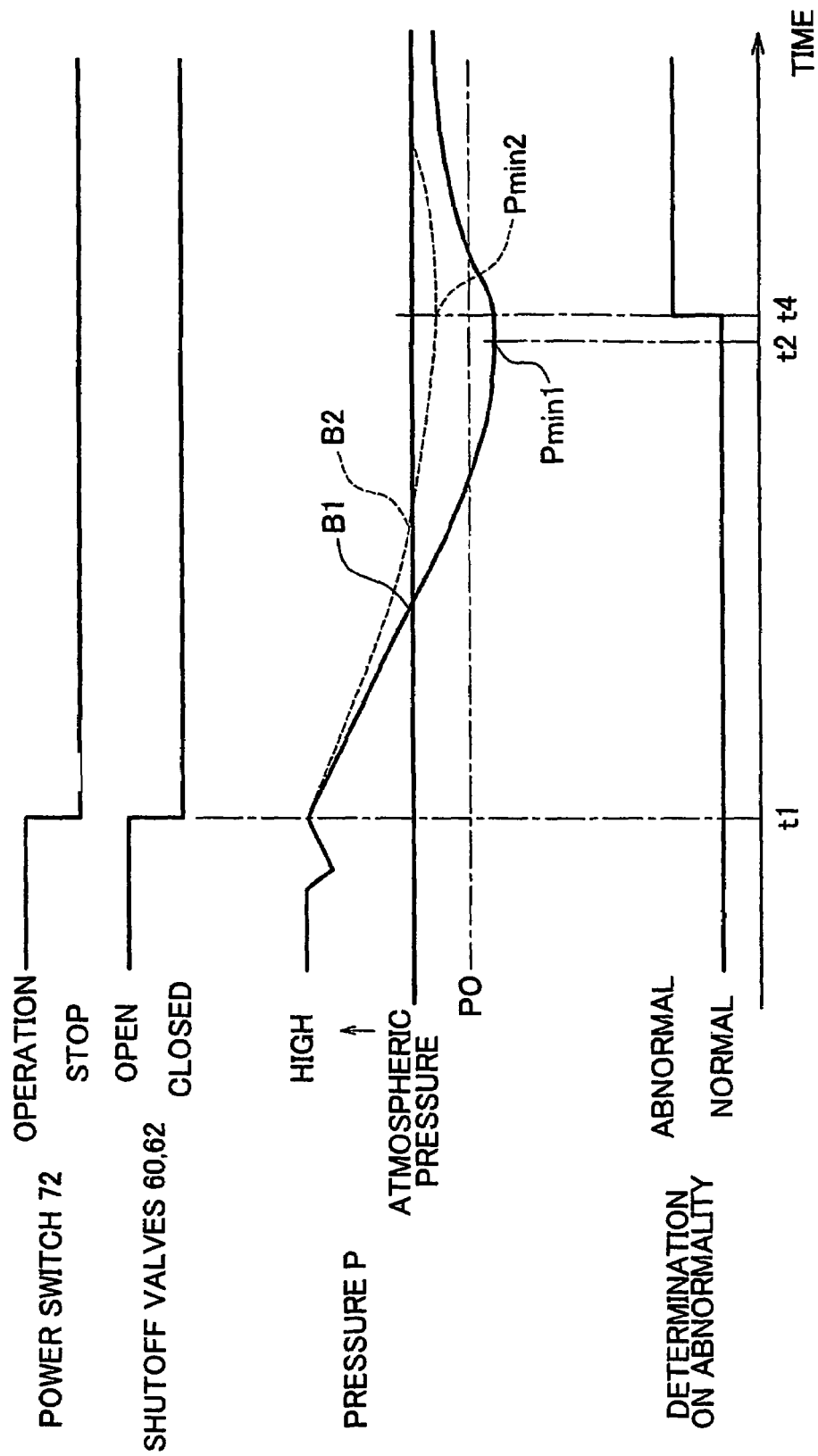
FIG. 7 is a timing chart describing processes of the fuel cell stop time routine according to the second embodiment of the invention.

FIG. 7 is a timing chart describing processes of the fuel cell stop time routine according to the second embodiment of the invention. As shown in the timing chart, the pressure P gradually decreases after the shutoff valves 60, 62 are closed (at time t1) as shown by a solid line B1. Then, the decreased pressure P starts to increase (at time t2). The time t2 at which the pressure P starts to increase can be detected by determining whether the pressure change ΔP is larger than the value 0 in step S360. It is determined whether the minimum pressure value of the pressure P is higher than the predetermined value P0 by determining whether the previous time pressure XP is higher than the predetermined value P0.

When there is a hole in the electrolyte membrane, the pressure P changes as shown by a dashed line B2 in FIG. 7. When there is a hole in the electrolyte membrane, the pressure P on the hydrogen electrode side is not likely to be negative pressure. Therefore, a minimum pressure value Pmin2 at an abnormal time when there is a hole in the electrolyte membrane is much higher than a minimum pressure value Pmin1 at a normal time when there is no hole in the electrolyte membrane. Accordingly, the pressure value P0 (Pmin1<P0<Pmin2) which can be used for distinguishing a normal time and an abnormal time is obtained in advance by experiments or the like. The pressure value P0 is used for making a determination in step S370.

Accordingly, when an affirmative determination is made in step S370, that is, when it is determined that the previous time pressure XP is higher than the predetermined value P0 (at time t4 in FIG. 7), the CPU determines that there is a hole in the electrolyte membrane, and memorizes that a portion where there is abnormality (step S220) is the electrolyte membrane (step S380), and lights the warning lamp 74 (step S390). After the process in step S390 is performed, the routine proceeds to "return".

Meanwhile, when a negative determination is made in step S370, that is, when it is determined that the previous time pressure XP is lower than the predetermined value P0, the CPU determines that there is no hole in the electrolyte membrane, and the routine proceeds to "return".

As described above in detail, in the fuel cell system according to the second embodiment of the invention, when the command for stopping the entire in-vehicle power output system including the fuel cell system is issued, the shutoff valves 60, 62 are closed, and then it is determined whether the pressure change ΔP in the pressure P in the hydrogen passage in the fuel cell 20 which is closed by the shutoff valves 60, 62 is larger than the value 0, whereby the minimum pressure value of the pressure P is obtained. Then, it is determined whether the minimum pressure value is higher than the predetermined value P0. When an affirmative determination is made, it is determined that there is a hole in the electrolyte membrane of the fuel cell 20.

The pressure on the hydrogen electrolyte side becomes negative pressure due to permeation of hydrogen through the electrolyte membrane at a normal time when there is no hole in the electrolyte membrane. Meanwhile, when there is abnormality such as a hole in the electrolyte membrane, the pressure on the hydrogen electrode side is not likely to become negative pressure. In the fuel cell having the aforementioned configuration, it can be determined whether the minimum pressure value is lower than the predetermined value P0 by comparing the minimum pressure value and the predetermined value P0. Accordingly, in the fuel cell system according to the second embodiment of the invention, the decrease in the pressure due to permeation of hydrogen gas through the electrolyte membrane to the air electrode side is prevented from being wrongly determined as the decrease in the pressure due to abnormality such as a hole in the electrolyte membrane. Thus, it is possible to prevent the wrong detection of a gas leak.

A modified example (1) of the first embodiment can be applied also to the second embodiment of the invention.

Third Embodiment

A third embodiment of the invention will be described. The third embodiment is different from the first embodiment only in the processes of the fuel cell stop time routine, which is performed by the CPU of the electronic control unit 70. The configurations of hardware and software excluding the routine are the same. Components that are the same as those in the first embodiment are denoted by the same reference numerals.

FIG. 8 is a flowchart showing a fuel cell stop time routine according to a third embodiment of the invention. The routine is performed based on interruption at predetermined time intervals. In FIG. 8, steps which are the same as those of the fuel cell stop time routine according to the first embodiment are denoted by the same step numbers. The fuel cell stop time routine according to the third embodiment is the same as the fuel cell stop time routine according to the first embodiment except that step S195 is added between step S190 and step S200.

In other words, after the processes in step S170 and step S190 are performed, the CPU opens the shutoff valve 62 disposed in the circulation passage 54 and the shutoff valve 64 disposed in the discharge passage 56 for a predetermined time Tb (for example, 0.5 second) after a predetermined time Ta (for example, 1 second) elapses (step S195). Then, the routine proceeds to step S200.

FIG. 9 is a timing chart describing processes of the fuel cell stop time routine according to the third embodiment of the invention. As shown in FIG. 9, the pressure P gradually decreases after the shutoff valves 60, 62 are closed (at time t1), as shown by a solid line B1. When the pressure P decreases to the second pressure range Rb, the pressure change speed dP2 shown by the inclination of a solid line L2 is obtained. Then, after the predetermined time Ta elapses, the shutoff valves 62, 64 are opened (at time t11) for the predetermined time Tb. After both the shutoff valves 62, 64 are opened, the hydrogen gas in the passage area including the fuel cell 20, which is closed by the shutoff valves 60, 62, is discharged to the outside through the discharge passage 56. As a result, the pressure P detected by the pressure sensor 66 starts to decrease sharply at time t11.

When the shutoff valves 62, 64 are closed after a predetermined time Tb elapses, the pressure decrease speed of the pressure P returns to the pressure decrease speed before the shutoff valves 60, 62 were opened. Subsequently, when the pressure P decreases to the first pressure range Ra, the pressure change speed dP1 shown by the inclination of the solid line L1 is obtained. Then, it is determined whether there is abnormality such as a hole in the electrolyte membrane based on both the pressure change speeds dP1, dP2 in the same manner as in the first embodiment.

Accordingly, in the fuel cell system 10 according to the third embodiment, the hydrogen gas in the passage area closed by the shutoff valves 60, 62, that is, the hydrogen gas in the hydrogen passage provided in the fuel cell is forcibly discharged to the outside during a period since the pressure change speed dP2 is obtained until the pressure change speed dP1 is obtained. Therefore, the time point at which the first pressure change speed dP1 is obtained can be advanced as compared to the first embodiment. As a result, determination on gas leak can be made in a short time after the power switch 72 is turned off.

A modified example of the third embodiment will be described.

(4) In the third embodiment, the hydrogen gas in the passage area closed by the shutoff valves 60, 62 is forcibly discharged via the discharge passage 56, whereby the pressure P detected by the pressure sensor 66 is forcibly reduced. Instead, the hydrogen gas in the aforementioned passage area may be consumed by causing the fuel cell 20 to generate electric power. More particularly, in this case, a process of causing the fuel cell 20 to generate electric power is performed by controlling operation of the DC-DC converter 82 and operation of the inverter 84 using the electronic control unit 70. With this configuration, the pressure P can be easily reduced.

(5) In the configuration according to the third embodiment, the process of forcibly reducing the pressure is applied to the configuration according to the second embodiment. Instead, the process of forcibly reducing pressure may be applied to the configuration according to the second embodiment. More particularly, in this case, the process of the aforementioned step S195 is performed between step S320 and step S330 in the fuel cell stop time routine shown in FIG. 6. With this configuration, the minimum pressure value of the pressure P can be detected early as compared to the second embodiment. As a result, determination on gas leak can be made in a short time after the power switch 72 is turned off.

(6) In the third embodiment, when the command for stopping the in-vehicle power output system is received from the power switch 72 operated by the driver, the pressure change speeds dP1, dP2 are obtained at two time points, that is, at the time point when the pressure P reaches the first pressure range Ra in the vicinity of atmospheric pressure, and at the time point when the pressure P reaches the second pressure range Rb that is on the high pressure side of the first pressure range Ra. Instead, the pressure change speed dP2 in the second pressure range Rb may be obtained in advance when the fuel cell 20 is stopped while the vehicle is operated.

The vehicle in this embodiment includes the battery 80 in addition to the fuel cell 20 as the driving source. Therefore, the electronic control unit 70 can switch between a fuel cell mode in which the vehicle is operated using the fuel cell 20 and a battery mode in which the vehicle is operated using the battery 80, according to the operating state of the vehicle. The configuration may be such that a combination mode in which the vehicle is operated using both the fuel cell 20 and the battery 80 can be also selected. In this case, the pressure change speed dP2 in the second pressure range Rb is obtained in advance when operation of the fuel cell 20 is stopped in the battery mode. Then, when the command for stopping the in-vehicle power output system is received from the power switch 72, the shutoff valves 62, 64 are opened only for a predetermined time, and the hydrogen gas in the passage area closed by the shutoff valves 60, 62 is forcibly discharged to the outside, after which the pressure change speed dP1 in the first pressure range Ra is detected.

With this configuration, it is not necessary to obtain the pressure change speed dP2 in the second pressure range Rb when the entire system for determining gas leak is stopped. Therefore, the time required for determining gas leak can be reduced. More particularly, it is possible to solve the problem that the process continues for a long time after the command for stopping the entire system is issued, which increases consumption of the battery. When the configuration according to the modified example (6) is applied to the configuration according to the modified example (4) of the first embodiment, the time required for determining gas leak can be further reduced.

(7) The configuration in which the pressure change speed dP2 in the second pressure range Rb is obtained in advance when the fuel cell 20 is stopped while the vehicle is operated as shown in the modified example (6) may be applied to the configuration according to the first embodiment, in which the process of forcibly discharging gas via the discharge passage 56 is not performed.

Although it has been described that gas leak due to a hole in the electrolyte membrane of the fuel cell can be detected in the aforementioned first to third embodiments and the modified examples thereof, it is possible to detect not only gas leak due to a hole in the electrolyte membrane but also gas leak due to damage to a hydrogen passage groove provided in the separator of the fuel cell, gas leak due to damage to a pipe in the passage area in which the pressure is detected, or the like.

The invention is not limited to the aforementioned first to third embodiments and the modified examples thereof, and may be realized in various embodiments without departing from the true spirit of the invention. For example, the invention may be realized in the following modified example.

(8) In the first embodiment and the modified examples thereof, when the fuel cell 20 is operated, the shutoff valves 60, 62 are closed, the pressure change speeds are obtained at two time points during the period since the pressure P starts to decrease until the pressure P starts to increase, and the pressure change speeds are compared with each other, whereby leak of hydrogen gas is detected. Instead, the configuration may be as follows when the fuel cell 20 is started. First, when the fuel cell 20 is started, the shutoff valves 60, 62 are closed. Then, the shutoff valve 60 is opened, pressure is applied to the hydraulic passage in the fuel cell until the value of the pressure sensor 66 reaches a first pressure value (for example, a value which is higher than the reference atmospheric pressure value by 50 kPa). When the value of the pressure sensor 66 reaches the first pressure value, the shutoff valve 60 is closed. Then, a pressure change speed dP11 of the pressure value detected by the pressure sensor 66 is obtained (the detection may be performed immediately after the pressure is applied to the hydraulic passage, or after a predetermined time elapses). Subsequently, the shutoff valve 60 is opened, and pressure is applied to the hydraulic passage in the fuel cell until the value of the pressure sensor 66 reaches a second pressure value (for example, a value which is higher than the reference atmospheric pressure value by 100 kPa). When the value of the pressure sensor 66 reaches the second pressure value, the shutoff valve 60 is closed. Then, a pressure change speed dP12 of the pressure value detected by the pressure sensor 66 is obtained (the detection may be performed immediately after the pressure is applied to the hydraulic passage, or after a predetermined time elapses). Then, as in the first embodiment, the two pressure change speeds dP11, dP12 are compared with each other, whereby leak of hydrogen gas is detected. With this configuration, it is possible to prevent the wrong detection of a gas leak as in the first embodiment.

(9) In the first embodiment and the modified examples, the pressure change speeds are obtained at two time points during the period since the shutoff valves 60, 62 are closed and the pressure P starts to decrease until the pressure P starts to increase, and the pressure change speeds are compared with each other, whereby leak of hydrogen gas is detected. In the second embodiment and the modified examples thereof, the minimum pressure value is detected when the pressure P becomes lowest after the shutoff valves 60, 62 are closed. When it is determined that the minimum pressure value becomes equal to or higher than the predetermined value, leak of hydrogen gas is detected. Instead, a time-dependent change during a period since the pressure P starts to decrease after the shutoff valves 60, 62 are closed until the pressure P starts to increase is analyzed, and leak of hydrogen gas is determined based on the result of this analysis.

(10) A moving object in which the fuel cell system according to each of the aforementioned embodiments is a vehicle such as an automobile. Instead, the fuel cell system may be installed in another moving object such as a ship or another industrial machine.

The invention claimed is:

1. A fuel cell system which includes a fuel cell; a supply passage that supplies hydrogen gas to the fuel cell; a discharge passage that discharges the hydrogen gas from the fuel cell; at least one valve element which is located in a predetermined portion in at least one of the supply passage and the discharge passage, and which closes off a hydrogen passage in the fuel cell; and control means for performing control that closes the at least one valve element, the fuel cell system comprising:

pressure detection means for detecting pressure in the hydrogen passage; and leak determination means for performing analysis of a change in the pressure detected by the pressure detection means when the at least one valve element is closed by the control means, and determining whether there is a leak of the hydrogen gas based on a result of the analysis.

2. A gas leak detection method for detecting a hydrogen gas leak in a fuel cell system which includes a fuel cell; a supply passage that supplies hydrogen gas to the fuel cell; a discharge passage that discharges the hydrogen gas from the fuel cell; and at least one valve element which is located in a predetermined portion in at least one of the supply passage and the discharge passage, and which closes off a hydrogen passage in the fuel cell, the method comprising the steps of:

(a) closing the at least one valve element;

(b) detecting pressure in the hydrogen passage in the fuel cell; and (c) performing analysis of a change in the pressure detected in the step (b) when the at least one valve element is closed in the step (a), and determining whether there is a leak of the hydrogen gas based on a result of the analysis.

3. The gas leak detection method according to claim 2, wherein the step (c) includes the steps of (c-1) obtaining pressure change speeds when the pressure detected in the step (b) reaches two different predetermined levels; and (c-2) comparing both the pressure change speeds obtained in the step (c-1), and determining that there is the leak when a difference between both the pressure change speeds exceeds a predetermined value.

4. The gas leak detection method according to claim 3, wherein one of the two different levels of the pressure is set to a first pressure range that is between atmospheric pressure and a pressure value of approximately 15 kPa greater than atmospheric pressure, and the other is set to a second pressure range which is on a high pressure side of the first pressure range.

5. The gas leak detection method according to claim 2, wherein the step (c) includes the steps of (c-1) detecting a minimum pressure value when the pressure detected in the step (b) is lowest; and (c-2) comparing the detected minimum pressure value and a predetermined value, and determining that there is the leak when it is determined that the minimum pressure value is higher than the predetermined value.

6. A fuel cell system comprising:

a fuel cell;

a supply passage that supplies hydrogen gas to the fuel cell;

a discharge passage that discharges the hydrogen gas from the fuel cell;

at least one valve element which is located in a predetermined portion in at least one of the supply passage and the discharge passage, and which closes off a hydrogen passage in the fuel cell;

a controller that performs control of closing the at least one valve element;

a pressure detector that detects pressure in the hydrogen passage; and a leak determination device that performs analysis of a change in the pressure detected by the pressure detector when the at least one valve element is closed by the controller, and determines whether there is a leak of hydrogen based on a result of the analysis.

7. The fuel cell system according to claim 6, wherein the at least one valve element includes a first valve element located in the supply passage and a second valve element located in the discharge passage.

8. The fuel cell system according to claim 6, wherein the leak determination device determines whether there is a leak of the hydrogen gas when the fuel cell is stopped.

9. The fuel cell system according to claim 6, wherein the leak determination device obtains pressure change speeds when the pressure detected by the pressure detector reaches two different predetermined levels; and compares both the obtained pressure change speeds, and determines that there is the leak when a difference between both the pressure change speeds exceeds a predetermined value.

10. The fuel cell system according to claim 9, wherein each of the two different predetermined levels is set to a value that can be reached during a period since the at least one valve element is closed until the pressure detected by the pressure detector, which has decreased, starts to increase.

11. The fuel cell system according to claim 10, wherein one of the two different levels of the pressure is set to a first pressure range that is between atmospheric pressure and a pressure value of approximately 15 kPa greater than atmospheric pressure, and the other is set to a second pressure range which is on a high pressure side of the first pressure range.

12. The fuel cell system according to 9, wherein the controller forcibly reduces the pressure in the hydrogen passage at a certain time between two time points at each of which the pressure change speed is obtained.

13. The fuel cell system according to claim 12, wherein the at least one valve element includes a first valve element located in the supply passage and a second valve element located in the discharge passage and the controller opens the second valve element at the certain time between the two time points and in order to reduce the pressure in the hydrogen passage.

14. The fuel cell system according to claim 12, wherein the controller causes the fuel cell to generate electric power so that the fuel cell consumes the hydrogen gas in the hydrogen passage at the certain time between the two time points in order to reduce the pressure in the hydrogen passage.

15. The fuel cell system according to claim 11, wherein the fuel cell system is installed in a moving object that includes a secondary battery in addition to the fuel cell as a driving source, and the leak determination device obtains, in advance, the pressure change speed when the pressure is in the second pressure range while operation of the fuel cell is stopped and the moving object is operated using only the secondary battery.

16. The fuel cell system according to claim 9, wherein the controller applies pressure to the hydrogen passage in the fuel cell, and one of the two different predetermined levels of the pressure is set to a first pressure value that can be reached when the controller applies pressure to the hydrogen passage, and the other is set to a second pressure value that can be reached when the controller applies pressure to the hydrogen passage again.

17. The fuel cell system according to claim 6, wherein the leak determination device detects a minimum pressure value when the pressure detected by the pressure detector is lowest; and compares the detected minimum pressure value and a predetermined value, and determines that there is the leak when it is determined that the minimum pressure value is higher than the predetermined value.

18. The fuel cell system according to claim 17, wherein the controller forcibly reduces the pressure in the hydrogen passage at a certain time during a period since the at least one valve element is closed by the controller until the minimum pressure value is detected by the leak determination device.

19. The fuel cell system according to claim 18, wherein the at least one valve element includes a first valve element located in the supply passage and a second valve element located in the discharge passage and the controller opens the second valve element at the certain time during the period since the at least one valve element is closed by the controller until the minimum pressure value is detected by leak determination device.

20. The fuel cell system according to claim 18, wherein the controller causes the fuel cell to generate electric power so that the hydrogen gas in the hydrogen passage is consumed at the certain time during the period since the at least one valve element is closed by the controller until the minimum pressure value is detected by the leak determination device.

* * * * *